J. PATTEN.
METHOD OF WATER PURIFICATION.
APPLICATION FILED SEPT. 4, 1914.
1,121,393.
Patented Dec. 15, 1914.
2 SHEETS—SHEET 1.
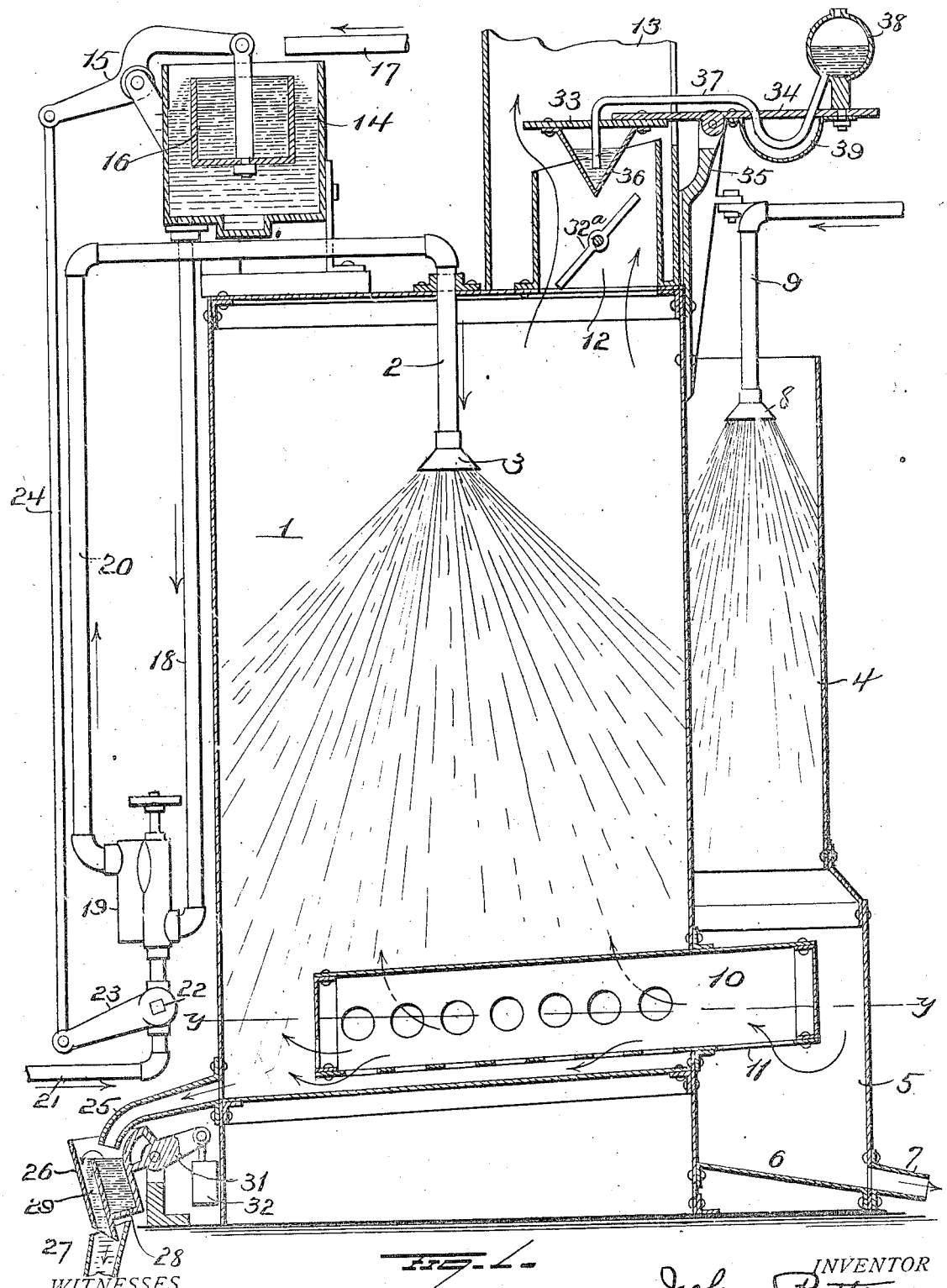

J. PATTEN.
METHOD OF WATER PURIFICATION.
APPLICATION FILED SEPT. 4, 1914.
1,121,393.
Patented Dec. 15, 1914.
2 SHEETS—SHEET 2.
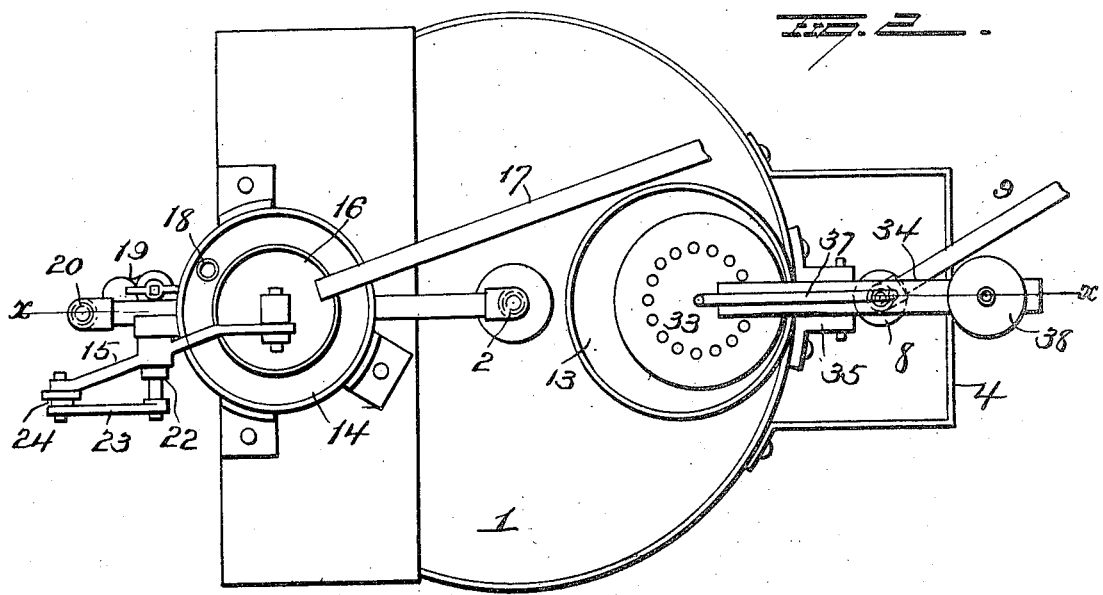
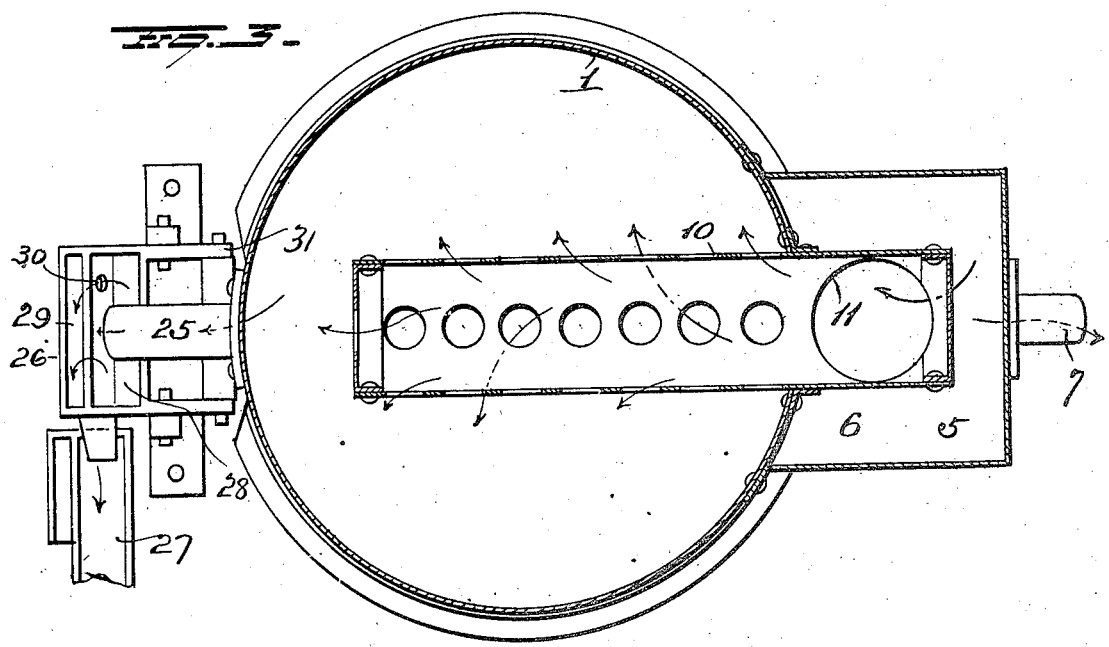
WITNESSES
INVENTOR
John Patten
By J. A. Seymour
Attorney

UNITED STATES PATENT OFFICE.

JOHN PATTEN, OF BALTIMORE, MARYLAND, ASSIGNOR OF ONE-HALF TO SAMUEL M. SHOEMAKER, OF ECCLESTON, MARYLAND.

METHOD OF WATER PURIFICATION.

1,121,393.  Specification of Letters Patent.  Patented Dec. 15, 1914.

Application filed September 4, 1914. Serial No. 860,285.

*To all whom it may concern:*

Be it known that I, JOHN PATTEN, of the city of Baltimore and State of Maryland, have invented certain new and useful Improvements in Methods of Water Purification; and I do hereby declare the following to be a full, clear, and exact description of the invention, such as will enable others skilled in the art to which it appertains to make and use the same.

This invention relates to an improved method of water purification and more particularly a method of treating water to be used in the manufacture of ice.

It has heretofore been proposed to manufacture ice from distilled water formed by condensing the steam which has been previously used for operating the machinery of an ice plant, and to reboil such water before the same is subjected to the freezing means, but it has been found in practice that "can" ice made with such water will contain a core having an objectionable odor, due to the concentration in the center of the block of ice, of partially decomposed organic matter and insoluble metallic compounds in the water derived from the metals of the condenser.

In the manufacture of ice in cans from distilled water, it has been the custom to pump continuously from a city water supply, or from a well or river, into the steam boiler, said water carrying with it some organic matter in solution and certain mineral compounds from iron, lime and other materials, in the form of soluble bi-carbonates, and also soluble compounds of mineral substances with organic acids. When this water is heated in the steam boiler, these compounds undergo certain changes; the bi-carbonates are usually decomposed, liberating carbonic acid, and leaving the minerals as an insoluble sediment in the boiler, while the carbonic acid, tannic acid and other organic acids, as well as any mineral acids as may be present, are vaporized and pass off with the steam through the steam engine and condense with the steam on the surface of the condenser, and form metallic compounds with the metals of which the condenser is composed. Some of these compounds like the bi-carbonate of iron, are soluble and pass through the filter into the ice mold where they form a core when the ice is formed and there are other compounds which pass off with the steam which are partial products of the decay of the organic matter in the water. At the high temperature of the steam boiler these objectionable compounds, which have a disagreeable odor, would decompose if a sufficient amount of free oxygen were present, but inasmuch as the oxygen dissolved in the water passes off with the first steam, when the water is heated, there are many hydrocarbons and other vapors that pass off with the steam in a state of partial decomposition, and these odoriferous substances condense with the water in the surface condenser, imparting to it a very objectionable odor and taste, which is sometimes compared to creosote. The condensed water as it is collected from the stills, is totally unfit for manufacturing ice. In addition to the above described substances, the steam used for manufacturing ice is also contaminated with a lubricating oil of the steam engine which it operates. These oils are sometimes partially decomposed and organic acids and other soluble gases generated, which contaminate the water. The undecomposed oil is separated by being allowed to float to the surface of the water while in a state of comparative rest, and a part of the function of my invention is to separate that portion which is partially decomposed and rendered soluble.

In attempting to purify the condensed water, it has been proposed to run it into a shallow tank, with a hood over it, and violently boil the water for about a half hour by heat imparted to it through a steam coil in the tank. By boiling away about ten per cent. of the water in this way it is found that the most of the carbonic acid is expelled, the soluble bi-carbonates of iron being converted into insoluble mono-carbonates, which may be filtered out. By this method, a much better quality of ice is produced than could be obtained from the condensed water without boiling, but notwithstanding this, there is usually a disagreeable odor left in the center of the cake of ice and also a white core formed by a small quantity of the metallic compounds, which were eaten away from the condenser, and this reboiling is also an expensive operation, inasmuch as from ten to fifteen per cent. of the fuel is frequently used to accomplish the reboiling. A plant making one hundred tons per day will consume about three tons of coal per day in supplying steam for the re-boiler, and my invention completely eliminates the reboiler, saves the fuel to operate the same and produces a superior quality of ice.

One object of my invention is to provide a method of purifying water for use in ice making, which will effectually eliminate all organic matter as well as mineral compounds from the water and thus avoid the formation of an objectionable and offensive core in the ice.

With this and other objects in view, the invention consists in certain novel steps in the process of purifying water as hereinafter set forth and pointed out in the claims.

In the accompanying drawings, which illustrates an apparatus whereby my improved method may be carried into effect, Figure 1 is a vertical longitudinal section on the line $x$—$x$ of Fig. 2; Fig. 2 is a plan view; and Fig. 3 is a sectional view on the line $y$—$y$ of Fig. 1.

My improved method of purifying distilled water for ice making comprises the spraying or atomizing the water while hot through a regulated quantity of air in such manner that the water, as it settled from the air, will still remain very hot, so that it will not retain any air or other gas in solution. This spraying is accomplished in a closed vessel provided with the necessary appliances for spraying the hot water and passing through the tank the required amount of air and avoiding the too rapid cooling of the water by the presence of too much air. This operation is conducted in such a manner that the gases and odors will leave the water and pass off with the air. The soluble metallic compounds are oxidized and rendered insoluble so that they can be filtered out, and I obtain a much superior quality of water by utilizing the heat of the water itself, and the air through which it is sprayed.

I have found that spraying cold water through air will not subserve the purpose of my invention, but that it is essential to the successful accomplishment of the purpose of my invention that the water shall be maintained hot and finely subdivided while it is being subjected to the air current. While the spraying of cold water through air might result in the removal of a portion of the material which would cause an odorous core in the ice, still it would absorb (even if it were previously pure) a sufficient amount of air and other gases to give a bad core to the ice.

In carrying out my invention, the water is preferably heated under pressure to a temperature considerably above the boiling point, so that when it is sprayed there will be a sufficient amount of steam generated from the heat within itself to divide or atomize the water into very fine particles. This aqueous mist will be of sufficiently high temperature to heat air to almost the boiling point so that the action of the free oxygen in the air will be very energetic in completing the decomposition of some of the partially decomposed matter and breaking it up into simpler and less objectionable compounds. The heat will also be sufficiently high to prevent the water from re-dissolving any of the gases that it may have given up and also to prevent it from absorbing air, which would later cause the formation of a white core in the ice.

In the apparatus shown in the drawings, 1 represents a tank, through the top of which a pipe 2 enters, the pipe being provided with a spraying nozzle 3. Adjacent to the tank 1 is a smaller tank or tube 4 having an open upper end and communicating at its lower end with a chamber 5 having an inclined bottom 6 and a discharge outlet 7. The air will freely enter the open upper end of the tank or tube 4 and as it passes downwardly through the same, will be subjected to a water spray which will serve to wash said air to free it from any dust or other solid particles which it might contain. The water spray in the auxiliary tank or tube 4, may be provided through the medium of a nozzle 8 at the end of a pipe 9 which enters the open end of said tank or tube, and said pipe may be supplied with water from any convenient source.

A perforated pipe 10 is disposed in proximity to the bottom of the tank 1 and projects into the air chamber 5, said pipe being provided (within the air chamber) with an air inlet opening 11, in its under portion, through which air passes (without carrying water with it) from the chamber 5 to the perforated pipe 10, by means of which latter the air will be discharged in the lower portion of the tank 1. In its passage upwardly through the heated aqueous mist in the tank 1, the air will be heated and will find an exit through a tube 12 to a suitable stack 13—such discharge of air being regulated as hereinafter described.

An open water receptacle 14 is mounted upon the tank 1 and supports a bell-crank lever 15 from one arm of which, a cup 16 is hung so as to be suspended within said receptacle. A pipe 17 from a condenser, conducts water (which usually has a temperature varying from two hundred to two hundred and twelve degrees Fah.) to the cup 16,—from which latter the hot water overflows into the receptacle 14. From the bottom of the receptacle 14, the hot water flows downwardly through a pipe 18 to a steam injector 19 and the latter operates to force the water upwardly through a pipe 20 which communicates with the pipe 2.

A pipe 21 supplies steam from any convenient source, to the injector 19, and in this pipe, a valve 22 is located. The stem of this valve is provided with an arm 23, with which the lower end of a rod 24 is connected, the upper end of said rod being connected with an arm of the bell-crank lever 15.

The cup 16 in the receptacle 14 acts as a float which, (when it rises) increases the supply of steam to the injector by imparting motion through the bell-crank 15, rod 24 and arm 23 to the valve 22, which will increase the opening movement of said valve. When the level of the water in the receptacle 14 descends, the cup 16 will descend and operate (through the connections above described) to operate the valve 22 in the reverse direction and thus throttle the steam to prevent the injector from exhausting the water supply. The steam injector will increase the pressure of the water to about one hundred pounds or more, to the square inch, in the pipe 20, and under such pressure the water will be discharged from the nozzle 3 and sprayed or atomized in the tank 1. The steam used for pumping the water also serves to heat it (or to maintain it hot) and it will be thrown from the nozzle in very fine particles at a temperature over the boiling point, which causes the small globules of water to divide up into very small particles, thereby exposing the water intimately to the action of the surrounding air and steam given off by the hot water,—under which conditions, the various gases and odors formerly held in solution by the water will, by the law of the diffusion of gases, leave the water and pass off with the air and water vapor formed, and those small particles will also be exposed to free oxygen of the atmosphere at a temperature a little below the boiling point. Under these conditions a great many of the compounds will be oxidized and rendered insoluble, and the gaseous produces from this decomposition will pass off with the air, while the mineral substances, which are rendered insoluble, may be filtered out after the water has cooled and before it reaches the ice molds.

In order to guard against the contamination of the water in the tank 1 by reason of too great a drop of temperature of the atomized water, which might occur by an abnormal reduction of the water supply, the appliances now to be explained may be employed.

Purified water is discharged from the tank 1 through a spout 25, into a by-pass device 26, which latter discharges into a suitable pipe or duct 27. The by-pass device comprises a receptacle 28 provided with a passage 29 into which water may overflow from the main portion of the receptacle, and the latter is provided at or near its bottom with a small hole 30 which communicates with the passage 29. The outer wall of the passage 29 projects somewhat above the main portion of the receptacle. The receptacle 26 is carried by a pivotally supported arm 31, from the free end of which, a weight 32 is suspended to counterbalance the said receptacle and its contents. During the normal operation of the apparatus, the by-pass device will be disposed as shown in Fig. 1, so that the water will flow from the receptacle and be discharged through the passage 29 into the receiving pipe or duct 27. Should an accident happen to the supply of water or steam, or anything go wrong with the injector, the consequent reduction of the supply of water would cause the temperature to drop to a point where the water would carry with it a sufficient amount of air and gases to form an objectionable core in the ice when the water has been frozen. To prevent this from contaminating the water previously treated, the drip holes 30 is made so small that it will not conduct all the water while the apparatus is working at normal capacity, and therefore part of it will overflow into the upper portion of the passage 29, but when the supply of water diminishes to the extent that the water will not have the desired qualities, the drip hole 30 will drain the receptacle 28, and the weight 32 will descend and elevate said receptacle 28 so as to cause the water to be discharged through the passage 29, without entering the pipe or duct 27.

The flow of air through the tank 1 may be regulated by a manually operable valve 32ª in the tube 12, if the supply of water to the tank be comparatively constant, said valve being set at the proper position after the temperature within the tank has been determined. However, where there is an irregularity of flow, which might cause the temperature within the tank 1 to fluctuate, the regulation of the air should be automatic. For this purpose, I have provided an automatic heat regulator comprising a valve 33 adapted to coöperate with the upper end of the damper pipe or tube 12, said valve being carried by an arm or lever 34 pivotally supported by a bracket 35. A bulb 36 (preferably of copper) depends from the valve 33 and is connected by a tube 37 with a bulb 38 mounted on the free end of the valve arm or lever 34, said tube passing through a cooling chamber 39 carried by said arm or lever. A sufficient amount of tetrachlorid of carbon is placed in said bulbs to fill one of them to about three-fourths its capacity. When the heat regulator is in its normal working condition as shown in the drawings, about one-half of the liquid will be in each bulb, and the valve will be balanced. Should the temperature in the tank 1 fall below 155° F. the liquid will run from the bulb 38 into the bulb 33 and the valve will descend, thus throttling the air and thereby allowing the hot water to increase the temperature. On the other hand, if the temperature in the tank 1 should rise too high,—above 160° F. for instance,—tetrachlorid vapors will be formed in the bulb 36 and drive the liquid through the tube 37 into the bulb 38, the increased weight in the latter causing it to descend and the valve 33 to rise,—thereby increasing the flow of air through the tank and producing the desired reduction of temperature. Other means might be employed for automatically controlling the flow of air through the tank and thus maintaining the temperature within the tank uniform.

Having fully described my invention what I claim as new and desire to secure by Letters-Patent, is:—

1. The herein described method of water purification, consisting in atomizing hot water in a regulated moving body of air.

2. The herein described method consisting, in atomizing hot water in a tank containing air, and maintaining the temperature within said tank approximately uniform.

3. The herein described method of water purification, consisting in atomizing hot water in a tank containing air, and maintaining the said air while in the tank at a temperature approximating the boiling point of water.

4. The herein described method of water purification, consisting in atomizing hot water in a tank in the presence of air, and regulating the exit of air and gases from said tank.

5. The herein described method of water purification, consisting in atomizing hot water under pressure in a tank in the presence of air in the tank, and regulating the flow of air and gases from the tank.

6. The herein described method of water purification, consisting in forcing hot water with steam through a spray nozzle into a closed chamber containing air whereby said air is heated and the organic matter in the atomized water is oxidized, and regulating the exit of air and gases from said tank.

7. The herein described method of water purification consisting in atomizing hot water in a closed chamber in the presence of air, and regulating the exit of air and gases from the chamber to regulate the temperature within the latter.

8. The herein described method of water purification consisting in atomizing hot water in a closed chamber in the presence of air, regulating the exit of air and gases from said chamber, and diverting the discharge of water from said chamber when the temperature in said chamber falls to a prohibitive degree.

9. The herein described method of water purification, consisting in forcing water with steam through a spray nozzle into a closed chamber containing air, discharging air and gases from the chamber and automatically controlling the temperature within the chamber, discharging purified water from the chamber, and diverting the discharge of water when the temperature within the chamber falls to a prohibitive degree.

10. The herein described method of water purification, consisting in atomizing hot water in a chamber in the presence of air, washing said air before it enters said chamber, and regulating the exit of air and gases from said chamber.

11. The herein described method of purifying distilled water, consisting in spraying said water while hot in a closed chamber through a regulated limited quantity of air, sufficiently small to allow the water to be discharged from the chamber while the water is still hot.

In testimony whereof, I have signed this specification in the presence of two subscribing witnesses.

JOHN PATTEN.

Witnesses:
HARRIET S. MAGRAW,
MARY E. UPMAN.